Patented July 13, 1937

2,086,732

UNITED STATES PATENT OFFICE 2,086,732

PROCESS AND PRODUCTS RELATING TO THE RECOVERY OF HCN

Russell W. Millar and Herbert P. A. Groll, Berkeley, Calif., assignors to Shell Development Company, San Francisco, Calif., a corporation of Delaware No Drawing. Application March 2, 1936, Serial No. 66,632

16 Claims. (Cl. 23—151)

This invention relates to a process for the removal and recovery of acidic gaseous components from mixtures containing the same. More particularly the invention relates to a practical and highly efficient process for the extraction, concentration and recovery of hydrocyanic acid from mixtures, particularly gaseous mixtures, containing it, and the invention further relates to useful solutions of hydrocyanic acid.

In general practice, desirable acidic gaseous components are removed from crude gaseous mixtures containing them by an operation which comprises contacting the gaseous mixture in an efficient manner, as by scrubbing, usually under an elevated pressure, with a liquid solvent for the gaseous component to be recovered; and recovering the dissolved component from the resulting solution by distillation, by releasing the pressure, or by a combination of these two methods. The efficiency of such an operation, as well as the purity of the recovered product, is dependent upon the efficiency of the selective solving action of the employed solvent upon the components of the gaseous mixture treated, upon the chemical stability of the solvent at the temperature of execution of the process, upon the boiling temperature of the solvent, and upon the difference between the vapor pressure of the liquid solvent and the vapor pressure of the gaseous solute at the temperature of the gaseous component recovery operation.

Numerous solvents have been proposed for use in such absorption and recovery processes. The majority of the solvents proposed for the absorption of acidic components from gaseous mixtures comprises an aqueous solution of a basic or basic-acting compound. Such solvents absorb the gaseous components by chemical reaction therewith; the solute being in general recovered from the resulting solution by reversal of the chemical absorption reaction as by boiling. Processes employing such solvents are in general inefficient due principally to their lack of selective solvent power, the limited extent to which they can be practically regenerated which involves material reagent losses, and the great expenditure of thermal energy necessary to effect their substantial regeneration. Alkaline solvents are very unsuitable for the recovery of hydrocyanic acid due to the ease with which this acid is hydrolyzed and converted to polymers in alkaline solutions.

The monohydric alcohol esters have been proposed as solvents for hydrocyanic acid. Their use has failed to provide a practical and economical process for HCN recovery. Due to their relatively low solvent power for HCN, large volumes of solvent must be handled which require costly equipment of great capacity and render recovery of HCN from the solvent very inefficient. From a technical standpoint, the liquid monohydric alcohol esters, as ethyl acetate and its homologues are very unsuitable due to their relatively low boiling temperatures and high volatilities at ordinary operating temperatures. For example, ethyl acetate due to its high vapor pressure cannot be used as a solvent for HCN at ordinary temperatures without prohibitive material losses. Ethyl acetate has an atmospheric boiling temperature of 77.4° C. and a vapor pressure of 76 mm. of Hg at 20° C., while the lowest ether of a polyhydric alcohol, namely, ethylene glycol monoethyl ether, has a boiling temperature of 124.3° C. and a vapor pressure of only 7 mm. of Hg at 20° C. The higher boiling monohydric alcohol esters as ethyl oxalate, ethyl phthalate, etc., have such a low solvent power for HCN that their use as solvents is highly impractical at ordinary temperatures. When they are used at reduced temperatures to increase their solvent power, they are still much inferior to the class of solvents provided by this invention, and their use at low temperatures necessitates costly cooling equipment.

The esters of polyhydric alcohols such as those contained in natural oils, fats and waxes are unsuitable for use in HCN recovery processes due to their low solvent power for HCN. The esters present are glycerides of long carbon chain acids as oleic, palmitic, etc., which acids contain a great number of directly linked carbon atoms devoid of oxygen atoms. The solid esters of glycerol, particularly the natural fats and waxes, which are normally solid at room temperature, have been proposed as HCN solvents. These solid esters must be dissolved in a liquid organic solvent and the resulting liquid solution employed. The resulting process possesses many inherent disadvantages. The solid esters are in themselves very poor solvents due to their long hydrocarbon chains, and the organic liquids suitable as solvents therefor, as chlorbenzene, tetrachlorethane, amyl alcohol, etc., are not only poor solvents themselves for HCN but they are relatively volatile. Thus, the use of solutions of the solid esters result in a materially decreased absorption capacity per unit volume of solvent employed and requires the handling of large volumes of absorbent solution, and the use of complex HCN recovery systems. Since the vapor pressures of the solvents which must be used for the solid esters are high at ordinary operating temperatures, costly recovery systems are necessary to avoid excessive losses of the volatile solvents.

It is an object of this invention to provide a class of excellent solvents for use in a process for the recovery of acidic gases, particularly hydrocyanic acid, from gaseous or liquid mixtures of the same. The members of the class of solvents provided are greatly superior in many respects to the known solvents for acidic gases in general, and they are superior in every respect to the known solvents for hydrocyanic acid. The class of solvents provided are normally liquid at ordinary temperatures, that is, at about 20° C., they are chemically stable at all practical operating temperatures, they have relatively high boiling temperatures, and they have extremely low vapor pressures at the temperatures employed in the process. Their use permits rapid and substantially complete absorption of the acidic gas in a relatively short contact time while working with a minimum volume of solvent. The absorbed acid gas is readily and substantially completely liberated from the solvent with a minimum expenditure of thermal energy and, since the absorbed gas is liberated in a substantially pure condition, a minimum treatment is required to further purify the recovered product.

The process of the present invention comprises extracting the acidic gaseous components from a mixture containing the same by contacting said mixture with a liquid solvent essentially comprising or consisting of an ether of a polyhydric alcohol, which ether is normally liquid at ordinary temperatures and in no molecule of which there is more than three directly linked carbon atoms which are devoid of oxygen atoms. Subsequent to the extraction operation, the liquid solvent containing the extracted gaseous component in solution is separated from the liquid or gaseous raffinate, and either the solvent or the absorbed acidic component recovered by heating the solution to expel the absorbed gas, or by reducing the pressure whereby separation of the dissolved gas is effected, or by a combination of these and other features.

The class of normally liquid solvents contemplated may be regarded as polyhydric alcohols at least one carbinol group of which has been etherified, the ether group in no case being linked to a radical containing more than three directly linked carbon atoms none of which is linked to an oxygen atom.

The ethers of polyhydric alcohols which may be used in the execution of the invention must be normally liquid at ordinary temperatures, that is, at temperatures of about 20° C. to about 30° C., and no molecule of a suitable polyhydric alcohol ether must contain more than three directly linked carbon atoms which are devoid of oxygen atoms. It is to be understood that the limitation as to the maximum number of directly linked carbon atoms devoid of oxygen atoms which an ether of a polyhydric alcohol may possess has been imposed solely for the purpose of defining in a clear and positive manner a preferred class of solvents all members of which are operative in the invention and superior to known HCN solvents. We have found that the excellent absorptive power of the ethers of polyhydric alcohols suitable for use in the execution of the invention is dependent upon the presence of certain oxygen groups in the molecules of the solvent. All of the preferred class of solvents, of course, possess at least one ether group (C—O—C); their solvent power for HCN is also dependent on the presence of other oxygen groups one or more of which may be present in the molecule in addition to the essential ether group. Of these additional groups, the influence of the following has been noted: additional ether groups, the carbonyl group (=C=O) and the ester group

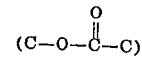

which may be considered as a combination of the ether and oxo groups. We have found that of the ethers of polyhydric alcohols having the same oxygen groups in their molecules, the one having the smallest number of directly linked carbon atoms devoid of oxygen atoms linked thereto possesses the greatest absorptive capacity toward hydrocyanic acid, which capacity progressively decreases as the number of directly linked carbon atoms devoid of oxygen atoms increases. The ethers of polyhydric alcohols which are most effectively employed in accordance with the invention are those which are normally liquid at ordinary temperatures and no molecule of which contains more than three directly linked carbon atoms devoid of oxygen atoms. All of the carbinol groups of a suitable polyhydric alcohol may be etherified with suitable alcohols in which case the compound may possess only ether radicals, as in ethylene glycol diethyl ether $$(C_2H_5—O—CH_2—CH_2—O—C_2H_5);$$

not all of the carbinol groups of a suitable polyhydric alcohol may be etherified in which case the compound contains hydroxy groups as well as an ether radical or radicals, as in ethylene glycol monomethyl ether $(CH_3—O—CH_2—CH_2OH)$, diethylene glycol $(CH_2OH—CH_2—O—CH_2—CH_2OH)$ and the like; some of the carbinol groups of a suitable polyhydric alcohol may be etherified and some esterified, the hydroxy hydrogen of all or only some of the carbinol groups being replaced by suitable ether and carboxylic acid ester residues, in which case the compound may contain only ether radicals and ester groups as in ethylene glycol monoethyl ether acetate $$(CH_3COO—CH_2—CH_2—O—C_2H_5),$$

or the compound may contain one or more carbinol groups, one or more ester groups and one or more ether radicals as in diethylene glycol monoacetate $$(CH_3COO—CH_2—CH_2—O—CH_2—CH_2OH).$$

The following normally liquid ethers of polyhydric alcohols, none of which contain more than three directly linked carbon atoms devoid of oxygen atoms, are representative members of the class defined: ethylene glycol monomethyl ether, ethylene glycol monoethyl ether, ethylene glycol monopropyl ether, ethylene glycol monoisopropyl ether, ethylene glycol monobutyl ether, ethylene glycol monoisobutyl ether, ethylene glycol monosecondary butyl ether, ethylene glycol monotertiary butyl ether, propylene glycol monomethyl ether, propylene glycol monoethyl ether, the propylene glycol monopropyl ethers, the propylene glycol normal, iso, secondary and tertiary butyl ethers, the straight as well as branched chain butylene glycol monomethyl, monoethyl and monopropyl ethers, the straight and branched chain amylene glycol monomethyl, monoethyl, monopropyl and monobutyl ethers and the like, ethylene glycol dimethyl ether, ethylene glycol diethyl ether, the ethylene glycol dipropyl ethers, the ethylene glycol dibutyl ethers, ethylene glycol methyl ethyl ether, the ethylene glycol methyl propyl, methyl butyl, ethyl butyl and propyl butyl ethers, propylene glycol dimethyl ether, propylene glycol diethyl ether, the propylene glycol dipropyl ethers, the propylene glycol dibutyl ethers, the propylene glycol mixed methyl ethyl, methyl propyl, methyl butyl, ethyl butyl, propyl butyl and ethyl propyl ethers, the straight as well as branched chain butylene and amylene dimethyl, diethyl, dipropyl, dibutyl, methyl ethyl, methyl propyl, methyl butyl, ethyl butyl, propyl butyl and ethyl propyl ethers and the like and their homologues, analogues and suitable substitution products which are normally liquid at about room temperature and which do not contain more than three directly linked carbon atoms devoid of oxygen atoms.

The compounds known as "polyglycols" are ethers of polyhydric alcohols and they are so considered for the purposes of the present invention and are embraced by the expression "ether of a polyhydric alcohol" as used herein and in the appended claims. A polyglycol is the product of the condensation of a molecule of a glycol with one or more molecules of the same or another species of glycol. For example, the lowest polyglycol is diethylene glycol

$(CH_2OH-CH_2-O-CH_2-CH_2OH)$.

This compound may be regarded as ethylene glycol, one carbinol group of which has been esterified by ethylene glycol, that is, one of the hydroxy hydrogen atoms has been replaced by the radical —$CH_2$—$CH_2OH$. The mixed polyglycols as ethylene propylene glycol and the like are also contemplated.

The following are representative polyglycols and compounds thereof which are suitable for use in accordance with the invention: diethylene glycol, triethylene glycol, dipropylene glycol, tripropylene glycol, the straight as well as branched chain dibutylene glycols, the tributylene glycols, the straight as well as branched chain diamylene glycols and the like and suitable substitution products thereof; the mixed, or asymmetrical, polyglycols as the ethylene propylene glycols, the straight as well as branched chain ethylene butylene and ethylene amylene glycols, propylene butylene glycol, propylene isobutylene glycol, the butylene amylene glycols and the like. It is to be noted that the branched chain as well as the straight chain polyglycols of both the symmetrical and asymmetrical types are suitable. For example, one or more hydrogen atoms of one or more carbon atoms of a straight chain polyglycol may be substituted by suitable univalent groups as hydroxy groups, carbinol groups, suitable ether groups, suitable ester groups, suitable alkyl groups, etc., provided the substituted compound possesses no more than three directly linked carbon atoms which are devoid of oxygen atoms.

Suitable "polyglycol compounds" in addition to the polyglycols proper, which may be used in the execution of the invention are the ethers of polyglycols. These polyglycol ethers may be considered as polyglycols wherein the hydroxy hydrogen atom of one or more carbinol groups has been replaced by a suitable radical which when linked to the oxygen atom of the polyglycol will not possess more than three directly linked carbon atoms devoid of oxygen atoms. A group of suitable normally liquid solvents of this type embraces among others the following: diethylene glycol monomethyl ether, diethylene glycol dimethyl ether, diethylene glycol monoethyl ether, diethylene glycol diethyl ether, diethylene glycol monopropyl ether, diethylene glycol monoisopropyl ether, the diethylene glycol dipropyl ethers, diethylene glycol monobutyl ether, diethylene glycol monoisobutyl ether, diethylene glycol monosecondary butyl ether, diethylene glycol monotertiary butyl ether, the diethylene glycol dibutyl ethers, diethylene glycol methyl ethyl ether, the diethylene glycol methyl propyl ethers, the diethylene glycol ethyl propyl ethers, the diethylene glycol methyl butyl, ethyl butyl and propyl butyl ethers, the triethylene glycol mono- and polymethyl, ethyl, propyl and butyl ethers, the triethylene glycol methyl ethyl, methyl propyl, methyl butyl, ethyl butyl, propyl butyl and ethyl propyl ethers, dipropylene glycol monomethyl ether, dipropylene glycol dimethyl ether, dipropylene glycol monoethyl ether, dipropylene glycol diethyl ether, the dipropylene glycol mono- and di- propyl and butyl ethers, the dipropylene glycol mixed methyl ethyl, methyl propyl, methyl butyl, ethyl butyl, propyl butyl, and ethyl propyl ethers, the tripropylene glycol mono- and poly-methyl, ethyl, propyl and butyl ethers, the tripropylene glycol mixed methyl ethyl, methyl propyl, methyl butyl, ethyl butyl, propyl butyl and ethyl propyl ethers, the straight chain and iso- butylene glycol mono- and di-methyl, ethyl, propyl and butyl ethers, the straight and branched chain amylene glycol mono- and di-methyl, ethyl, propyl and butyl ethers, the di-butylene and amylene glycol mixed methyl ethyl, methyl propyl, methyl butyl, ethyl butyl, propyl butyl and ethyl propyl ethers and the like and their suitable homologues, analogues and substitution products which are normally liquid at ordinary temperature and which possess not more than three directly linked carbon atoms devoid of oxygen atoms.

A valuable subgroup of ethers of polyhydric alcohols of the class herein defined embraces normally liquid compounds which may be termed ether-esters of polyhydric alcohols. The ether-esters of polyhydric alcohols may be regarded as ethers of polyhydric alcohols of the type herein described wherein at least one of the carbinol groups of the polyhydric alcohol has been esterified with a carboxylic acid containing no more than three directly linked carbon atoms devoid of oxygen atoms. This subgroup of ethers embraces among others the following compounds: ethylene glycol monomethyl ether formate, ethylene glycol monomethyl ether acetate, ethylene glycol monomethyl ether propionate, ethylene glycol monomethyl ether butyrate, ethylene glycol monomethyl ether isobutyrate, ethylene glycol monoethyl ether formate, ethylene glycol monoethyl ether acetate, ethylene glycol monoethyl ether propionate, the ethylene glycol monoethyl ether butyrates, the ethylene glycol monopropyl ether formates, acetates, propionates and butyrates, the ethylene glycol mono- normal, iso, secondary and tertiary butyl ether formates, acetates, propionates and butyrates, propylene glycol monomethyl ether formate, propylene glycol monoethyl ether formate, propylene glycol monoethyl ether acetate, the propylene glycol monopropyl, monoisopropyl, monobutyl, monoisobutyl, monosecondary butyl and monotertiary butyl ether formates, acetates, propionates, normal butyrates and isobutyrates, the straight as well as branched chain butylene and amylene glycol mono-methyl, ethyl, propyl and butyl ether formates, acetates, propionates and butyrates, diethylene glycol monomethyl ether formate, diethylene glycol monoethyl ether formate, diethylene glycol monomethyl ether acetate, diethylene glycol monoethyl ether acetate, the diethylene glycol monopropyl, isopropyl, normal butyl, isobutyl, secondary butyl and tertiary butyl ether formates, acetates, propionates and butyrates, the triethylene glycol mono-methyl, ethyl, propyl and butyl ether formates, acetates, propionates and butyrates, dipropylene glycol monomethyl ether formate, dipropylene glycol monomethyl ether acetate, dipropylene glycol monobutyl ether acetate, the dipropylene glycol methyl, ethyl, propyl and butyl ether formates, acetates, propionates and butyrates, the dibutylene and diamylene glycol methyl, ethyl, propyl and butyl ether formates, acetates, propionates and butyrates and the like.

It is to be understood that the invention is not to be regarded as limited to the use of the ethers of dihydric alcohols. The normally liquid ethers of polyhydric alcohols containing more than two carbinol groups are excellent solvents for acidic gases, particularly hydrocyanic acid, provided said ethers do not possess more than three directly linked carbon atoms devoid of oxygen atoms. The following ethers of glycerol are representative of suitable ethers of the higher polyhydric alcohols; glycerol monomethyl ether, glycerol dimethyl ether, glycerol trimethyl ether, the glycerol mono- and poly-ethyl, propyl and butyl ethers, the glycerol mixed methyl, ethyl, propyl and butyl ethers, diglycerol, the β-methyl glycerol mono- and poly-methyl, ethyl, propyl and butyl ethers, glycerol monomethyl ether monoformate, glycerol dimethyl ether formate, β-methyl glycerol monoethyl ether monoacetate, β-methyl glycerol diethyl ether acetate, di-β-methyl glycerol, diglycerol monomethyl ether, diglycerol dimethyl ether, the diglycerol mono- and poly-ethyl, propyl and butyl ethers, the di-β-methyl glycerol mono- and poly-methyl, ethyl, propyl and butyl ethers, diglycerol monomethyl monoformate, diglycerol monomethyl monoacetate, and the like and their homologues, analogues and suitable substitution products. The ethers and ether-esters of higher polyhydric alcohols as erythritol monomethyl ether, erythritol dimethyl ether, erythritol monomethyl ether monoformate, erythritol monoethyl ether monoacetate, and the like, are suitable solvents for use in accordance with the invention.

The stable higher boiling cyclic ethers of polyhydric alcohols, which ethers are normally liquid at ordinary temperatures and no molecule of which contains more than three directly linked carbon atoms devoid of oxygen atoms, are also contemplated as within the scope of the invention. Diethylene oxide (dioxane) and its suitable homologues and substitution products are representative members of this subgroup of suitable solvents.

The process of the invention is applicable broadly to the recovery of acidic gases as $H_2S$, $SO_2$, $CO_2$, HCN and the like from gaseous or liquid mixtures containing one or more of said components. Such acid gaseous components may be recovered from industrial or natural gas mixtures containing the same as coal gas, oil gas, water gas, natural gas, smelter gases and the like, and from other gases, such as air, nitrogen, gases of combustion, etc. The object may be to recover the acidic component or components, to purify the gas mixture, or to recover the valuable acidic component while at the same time purifying the gas mixture for further use. The process provides means for recovering acidic gases in a superior solvent, the use of which does not necessitate chemical regeneration methods nor require the use of aqueous solutions which might lead to plant corrosion.

The invention is particularly valuable in that it provides a practical and economical process for the extraction and recovery of hydrocyanic acid from mixtures containing it. The HCN in gaseous or liquid mixtures can be readily extracted therefrom and the HCN readily and substantially completely recovered from the solvent in a substantially pure condition. The losses of HCN, due to hydrolysis and polymerization of the HCN attendant on the absorption of HCN in alkaline and aqueous alkaline solvents and the subsequent recovery of HCN therefrom, are obviated by the use of members of the class of solvents provided by this invention. The source of the hydrocyanic acid mixture is of no importance; the mixture of the acid may be obtained from formamide, ammonia and carbon monoxide, hydrocarbons and ammonia, hydrocarbons and nitric oxide, etc.

The process is preferably executed by contacting a gaseous mixture containing hydrocyanic acid, in any desirable manner, as in a packed column, scrubbing tower, etc., at a suitable temperature and pressure, with a liquid solvent comprising or consisting of one or a plurality of the ethers of polyhydric alcohols herein described. Liquid phase extraction methods may be resorted to if desired. The absorption of the hydrocyanic acid may be effected at any desired temperature. A material advantage of the process resides in the high solvent power of the solvents employed, which permits their practical use at temperatures of 20° C. and higher. The known process must be executed at low temperatures in order for the solvents to be effective, thus necessitating the use of costly cooling equipment. The extraction may be effected at atmospheric or superatmospheric pressure.

The hydrocyanic acid absorbed in the solvent may be recovered by heating the solution in any desired manner, for example, in a suitable still or stripping column, or the hydrocyanic acid may be partially or substantially completely recovered in some cases by releasing the pressure on the solution. If desired, a combination of these and/or other recovery methods may be utilized. The process may be executed in a batch, intermittent or continuous manner. When a continuous mode of operation is resorted to, the solvent regenerated in the recovery stage may be recirculated to the absorption stage.

A convenient mode of operation when hydrocyanic acid is recovered from gaseous mixtures comprises countercurrently contacting the gas mixture with the solvent in a scrubbing tower containing plates or other suitable contact elements. The solvent subsequent to its contact with the gas mixture may be removed from the base of the tower with a predetermined hydrocyanic acid content varying from a state of saturation downwards, depending upon the requirements of the particular operation and the whim of the operator. In most operations, a solvent which is from about 50% to about 100% saturated with hydrocyanic acid may be handled practically. The solvent may be recirculated through the scrubbing tower until the desired saturation point is reached and then conducted to a suitable stripping column for the recovery of hydrocyanic acid and/or solvent. The solvent, partially or substantially completely freed of hydrocyanic acid, may be recirculated. Alternatively, only part of the solvent may be sent to the stripping column while a predetermined portion is continuously recycled through the scrubbing tower with fresh solvent.

The following Table I, which is included for purposes of illustration only and is not intended as limiting the invention, illustrates the solvent power for hydrocyanic acid of some representative members of the class of ethers of polyhydric alcohols to which the invention appertains. The table also lists the atmospheric boiling temperature and the vapor pressure at 20° C. of the recited solvents.

A gas mixture containing about 4% by volume of HCN was contacted with the respective solvents at about room temperature and atmospheric pressure until the solvents were saturated with HCN at its partial pressure in the inlet gas. The amount of HCN taken up by a liter of each solvent under these conditions is listed in the following table:

Table I

| Solvent | Boiling tempera- °C. # | Vapor pressure 20° C. # | Grams HCN/liter of solvent |
|---|---|---|---|
| Ethylene glycol monoethyl ether | 134.5 | 3 | 52 |
| Diethylene glycol | 244.5 | 0.1 | 35 |
| Diethylene glycol monoethyl ether | 198.0 | 0.1 | 40 |
| Diethylene oxide (dioxane) | 101.5 | 26 | 72 |
| Ethylene glycol monoethyl ether acetate | 153.0 | 1.25 | 52 |

Data taken from Durrans' Solvents (1930) and Carbide & Carbon Chem. Corporation's Synthetic Organic Chemicals, 7th Ed., (1935). The former describes all of the listed solvents as being liquid at room temperature.

To demonstrate the superiority of the members of the claimed class of solvents over other organic compounds which have been proposed as HCN solvents, the following materials were tested under the same conditions as were used for the attainment of the data tabulated in Table I. The materials and their solvent power are listed in the following table:

Table II

| Solvent | Grams HCN/ liter of solvent |
|---|---|
| Ethylene glycol | 14 |
| Ethyl oxalate | 24 |
| Ethyl malonate | 22 |
| Ethyl phthalate | 16 |
| Cotton seed oil | 3.2 |
| Sardine oil | 3.8 |
| Solution of 7.8% by weight of beeswax in chlorbenzol | 1.04 |
| Solution of 40% by weight of lard in chlorbenzol | 4.5 |
| Chlorbenzol | 0.9 |

By a comparison of the data of the two tables, it is seen that the members of the class of polyhydric alcohol ethers to which this invention relates, the solvent power of which is illustrated by the data in Table I, are decidedly superior to the known HCN solvents, the solvent power of which is illustrated by the data of Table II, which data were obtained under the same conditions of operation.

Following the absorption of the acidic components in the liquid polyhydric alcohol ether or ethers, the acidic gaseous component or components need not be separated therefrom at once or shortly after the absorption. The solutions of the acidic gas or gases in the liquid solvent may be stored or transported as such and the acidic component or components recovered therefrom when and as desired. In many cases reactions of the absorbed gases with other reagents to form useful products may be effected in the solvent in which the extracted component is dissolved. It is seen that solutions of acidic gases in ethers of polyhydric alcohols, which ethers are normally liquid at ordinary temperatures are novel, valuable and useful compositions of matter.

Solutions of hydrocyanic acid in normally liquid ethers of polyhydric alcohols are particularly valuable and useful compositions of matter. They may be very advantageously employed as media for the storage and/or shipment of HCN, which acid will polymerize much less rapidly when in such solutions than when in the pure state. Reactions of HCN with other reagents, as its condensation with aldehydes, ketones, oxides, etc., may be carried out with the HCN in solution in the solvent. These reactions are more easily controlled when carried out in an inert solvent such as the liquid ethers of polyhydric alcohols provide. The use of the absorbent solvent as a diluting media for the further reactions of the dissolved HCN offers material advantages in that the step of distilling the absorbed HCN from the solvent need not be resorted to.

This application is a continuation-in-part of our application Serial No. 678,058, filed June 28, 1933.

While we have in the foregoing described in some detail the preferred embodiment of our invention and some variants thereof, it will be understood that this is only for the purpose of making the invention more clear and that the same is not to be regarded as limited to the details of operation described, nor is it dependent upon the soundness or accuracy of the theories which we have advanced as to the advantageous results attained. On the other hand, the invention is to be regarded as limited only by the terms of the accompanying claims, in which it is our intention to claim the invention as broadly as possible in view of the prior art.

We claim as our invention:

1. A process for the removal of hydrocyanic acid from mixtures containing the same which comprises the step of extracting the mixture with an ether of a polyhydric alcohol, which ether is normally liquid at ordinary temperature and no molecule of which contains more than three directly linked carbon atoms devoid of oxygen atoms.

2. A process for the removal of hydrocyanic acid from gaseous mixtures containing the same which comprises the step of scrubbing the mixture with an ether of a polyhydric alcohol, which ether is normally liquid at ordinary temperatures and no molecule of which contains more than three directly linked carbon atoms devoid of oxygen atoms.

3. A process for the removal of hydrocyanic acid from a gaseous mixture containing the same which comprises the step of scrubbing the mixture with an ether of a polyhydric alcohol at least one carbinol group of which has been esterified with a carboxylic acid, which ether is normally liquid at ordinary temperatures and no molecule of which contains more than three directly linked carbon atoms devoid of oxygen atoms.

4. A process for the removal of hydrocyanic acid from a gaseous mixture containing the same which comprises the step of scrubbing the mixture with an ether of a glycol, which ether is normally liquid at ordinary temperatures and no molecule of which contains more than three directly linked carbon atoms devoid of oxygen atoms.

5. A process for the removal of hydrocyanic acid from a gaseous mixture containing the same which comprises the step of scrubbing the mixture with a mono-ether of a glycol the other carbinol group of which has been esterified with a carboxylic acid, which ether is normally liquid at ordinary temperatures and no molecule of which contains more than three directly linked carbon atoms devoid of oxygen atoms.

6. A process for the removal of hydrocyanic acid from a gaseous mixture containing the same which comprises the step of scrubbing the gas mixture with a polyglycol, which polyglycol is normally liquid at ordinary temperatures and no molecule of which contains more than three directly linked carbon atoms devoid of oxygen atoms.

7. A process for the removal of hydrocyanic acid from a gaseous mixture containing the same which comprises the step of scrubbing the gas mixture with a carboxylic acid ester of a polyglycol, which solvent is normally liquid at ordinary temperatures and no molecule of which contains more than three directly linked carbon atoms devoid of oxygen atoms.

8. A process for the removal of hydrocyanic acid from a gaseous mixture containing the same which comprises the step of scrubbing the mixture with ethylene glycol monoethyl ether.

9. A process for the removal of hydrocyanic acid from a gaseous mixture containing the same which comprises the step of scrubbing the mixture with ethylene glycol monoethyl ether acetate.

10. A process for the removal of hydrocyanic acid from a gaseous mixture containing the same which comprises the step of scrubbing the mixture with diethylene oxide.

11. A composition of matter comprising hydrocyanic acid dissolved in an ether of a polyhydric alcohol, which ether is normally liquid at ordinary temperatures and no molecule of which contains more than three directly linked carbon atoms devoid of oxygen atoms.

12. A composition of matter comprising hydrocyanic acid dissolved in an ether of a polyhydric alcohol at least one carbinol group of which has been esterified with a carboxylic acid, which ether is normally liquid at ordinary temperatures and no molecule of which contains more than three directly linked carbon atoms devoid of oxygen atoms.

13. A composition of matter comprising hydrocyanic acid dissolved in an ether of a glycol, which ether is normally liquid at ordinary temperatures and no molecule of which contains more than three directly linked carbon atoms devoid of oxygen atoms.

14. A composition of matter comprising hydrocyanic acid dissolved in a polyglycol, which polyglycol is normally liquid at ordinary temperatures and no molecule of which contains more than three directly linked carbon atoms devoid of oxygen atoms.

15. A composition of matter comprising hydrocyanic acid dissolved in ethylene glycol monoethyl ether.

16. A composition of matter comprising hydrocyanic acid dissolved in ethylene glycol monoethyl ether acetate.

RUSSELL W. MILLAR.
HERBERT P. A. GROLL.